US009022264B2

(12) United States Patent
Jutila et al.

(10) Patent No.: US 9,022,264 B2
(45) Date of Patent: May 5, 2015

(54) RECONFIGURABLE ROOF RACK ATTACHMENT ASSEMBLY FOR A VEHICLE

(71) Applicant: GM Global Technology Operations LLC, Detroit, MI (US)

(72) Inventors: Brian J Jutila, Richmond, MI (US); Ronald J. Wojciechowski, Sterling Heights, MI (US); Mark A. Fredal, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 118 days.

(21) Appl. No.: 13/676,150

(22) Filed: Nov. 14, 2012

(65) Prior Publication Data
US 2014/0131406 A1 May 15, 2014

(51) Int. Cl.
*B60R 9/058* (2006.01)
(52) U.S. Cl.
CPC ........... *B60R 9/058* (2013.01); *Y10T 29/49622* (2015.01)
(58) Field of Classification Search
CPC ...................................... B60R 9/058
USPC .................. 224/321, 322, 309–320, 323–331
See application file for complete search history.

(56) References Cited

U.S. PATENT DOCUMENTS

| 4,967,945 | A  | * | 11/1990 | Bott ............................... 224/326 |
| 5,782,392 | A  | * | 7/1998  | Yamamoto ..................... 224/326 |
| 5,975,391 | A  | * | 11/1999 | Aftanas et al. ................ 224/309 |
| 6,568,748 | B2 |   | 5/2003  | Yoon |
| 7,237,835 | B2 | * | 7/2007  | Leroy et al. .............. 296/216.01 |
| 7,695,038 | B2 |   | 4/2010  | Harberts et al. |
| 2009/0021053 | A1 | * | 1/2009 | Harberts et al. .............. 296/213 |

* cited by examiner

*Primary Examiner* — Adam Waggenspack
(74) *Attorney, Agent, or Firm* — Quinn Law Group, PLLC

(57) ABSTRACT

A roof rack attachment assembly for a vehicle is provided along with a method of assembling a vehicle having a roof panel capable of receiving a roof rack attachment at a predetermined attachment point is provided. The vehicle may include a roof panel defining a plurality of elongated grooves. The assembly may include a groove applique disposed within and along the length of each of the elongated grooves. The groove applique may be secured within each of the elongated grooves with a plurality of securing components placed along the length of the elongated groove. A plurality of attachment features may be coupled to the groove applique at predetermined locations, defining a predetermined attachment point for a vehicle roof rack. The roof rack assembly allows a roof rack of any style to be added, removed, or replaced at the each of the predetermined attachment points throughout the life of the vehicle.

9 Claims, 3 Drawing Sheets

RECONFIGURABLE ROOF RACK ATTACHMENT ASSEMBLY FOR A VEHICLE

TECHNICAL FIELD

The invention relates to a reconfigurable roof rack attachment assembly for a vehicle.

BACKGROUND

Roof rack assemblies are often secured to vehicle roofs for supporting cargo above the roof. Rook rack assemblies often have longitudinally arranged roof rails. Transverse cross members, sometimes referred to as cross bows may be used to span the distance between the roof rails. Historically roof racks are designed to fit a specific vehicle and are manufactured thereon during assembly. Conventional roof racks are limited to use with a specific vehicle and consumers often cannot change the configuration or type of roof rack that comes standard on his or her purchased vehicle model. In such a situation conventional roof racks can be expensive and limiting to the manufacturer during assembly and to the end user.

SUMMARY

A roof rack attachment assembly for a vehicle is provided. The vehicle may include a roof panel defining a plurality of elongated grooves. The assembly may include a groove applique disposed within and along the length of each of the elongated grooves. The groove applique may be secured within each of the elongated grooves with a plurality of securing components placed along the length of the elongated groove. A plurality of attachment features may be coupled to the groove applique at predetermined locations, as each of the attachment features defines a predetermined attachment point for a vehicle roof rack. A vehicle roof rack may be removed and replaced at each of the predetermined attachment points throughout the life of the vehicle.

The roof rack attachment assembly may be easily installed on a vehicle during manufacture and assembly. The roof rack attachment assembly may further allow the replacement or reconfiguration of variably styled vehicle roof racks throughout the life of the vehicle.

A method of assembling a vehicle having a roof panel capable of receiving a roof rack attachment at a predetermined attachment point is also provided. The method includes the steps of: placing a groove applique within an elongated groove defined by the roof panel; placing a plurality of attachment features at desired predetermined attachment points along the groove applique; and securing the groove applique and attachment features within the elongated groove with a plurality of securing components.

The method may further include attaching a roof rack, of any style, to the vehicle at the predetermined attachment points during vehicle assembly, wherein the vehicle comes standard with a roof rack.

Alternatively, the method may further include overlaying a base molding upon the roof rack attachment assembly and attaching the base molding to the attachment features at the predetermined attachment points, wherein the vehicle is a base model vehicle that does not come standard with a roof rack. The attachment assembly will remain incorporated into the vehicle and able to receive a roof rack to be installed by the consumer or subsequent seller at a later date after assembly if desired.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
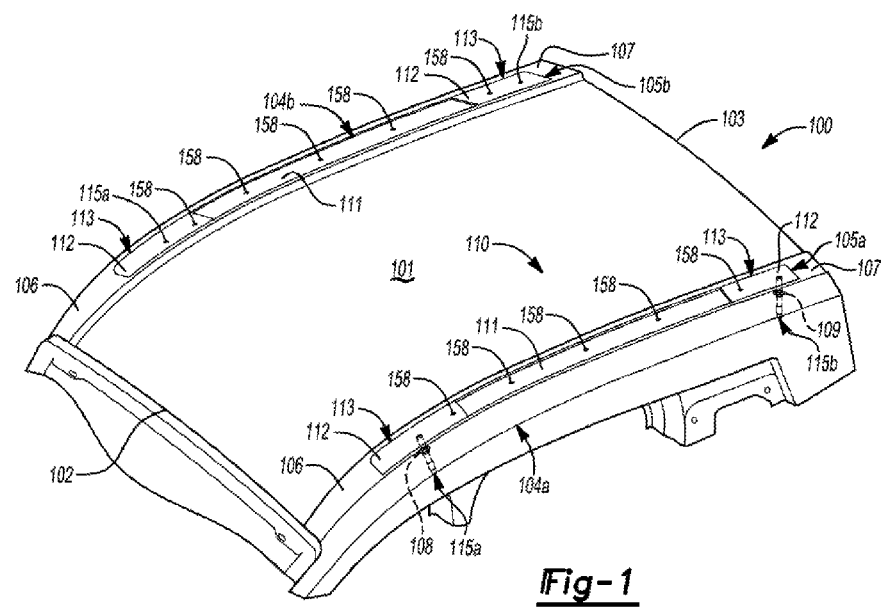
FIG. 1 is a schematic perspective view of the reconfigurable roof rack attachment assembly and roof panel.

Referring to the drawings, wherein like reference numerals refer to like components, FIGS. 1-6 depict vehicle 100 having a roof panel 101 and a roof rack attachment assembly 110 for attaching to and interchanging variably style roof racks 120 on the roof panel 101. A method for assembling a vehicle 100 having a roof panel 101 capable of receiving a roof rack 120 is also provided.

Referring to FIG. 1, a roof rack attachment assembly 110 for a vehicle 100 is shown. The vehicle 100 may include a roof panel 101 having a first end 102 and a second end 103. The roof panel 101 may also have roof panel opposing sides 104a, 104b.

The roof panel 101 may define a plurality of elongated grooves 105a, 105b. Each of the elongated grooves 105a, 105b may have a first end 106 and a second end 107. Each of the elongated grooves 105a, 105b may define a first bore 108 therein proximate the first end 106 and a second bore 109 therein proximate the second end 107. Each of the elongate grooves 105a, 105b may further define a plurality of apertures 158 therealong. In one example, the plurality of elongated grooves 105a, 105b may include a first elongated groove 105a and a second elongated groove 105b each formed longitudinally and substantially parallel to the opposing sides 104a, 104b of the roof panel 101. Aside from location upon the roof panel 101, the elongated grooves 105a, 105b and the componentry disposed therein are substantially identical. Therefore, only one will be described for illustrative simplicity.

The assembly 110 may include a groove applique 111 disposed within and along the length of each of the elongated grooves 105a, 105b. The assembly may also include a plurality of attachment features 112 coupled to the groove applique 111, wherein each of the attachment features 112 defines a predetermined attachment point 113 for a vehicle roof rack 120 or base molding 160 (shown in FIGS. 3-6). In one example, the attachment features 112 and predetermined attachment points 113 defined thereby may be located at each of the first end 106 and second end 107 of each of the elongated grooves 105a, 105b.

Figure 2A:
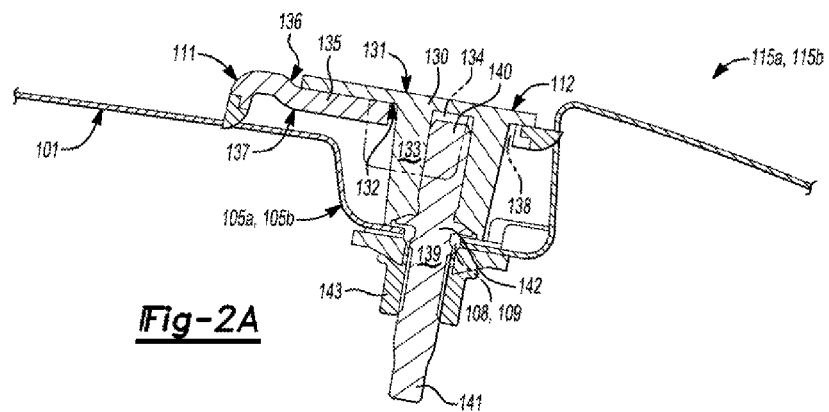
FIG. 2A is a schematic cross-sectional view of one stanchion attachment securing components coupling an attachment feature, and a groove applique to an elongated groove.
Figure 2B:
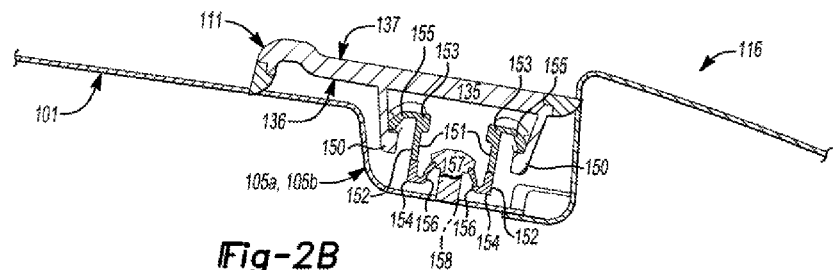
FIG. 2B is a schematic cross-sectional view of one ditch and bar attachment securing component securing the groove applique within one of the elongated grooves.

Referring to FIGS. 1, 2A, and 2B, the groove applique 111 may be coupled to the attachment features 112 and secured within one of the elongated grooves 105a, 105b with a plurality of securing components 115a, 115b, 116. In one example, the plurality of securing components 115a, 115b, 116 include two types.

The first type of securing component is a stanchion attachment 115a, 115b, namely a first stanchion attachment 115a and a second stanchion attachment 115b (shown in FIG. 1). The first stanchion attachment 115a secures the groove applique 111 to the roof panel 101 and couples the groove applique 111 and one of the attachment features 112 at the elongated groove 105a first bore 108. The second stanchion attachment 115b secures the groove applique 111 to the roof panel 101 and couples the groove applique 111 and one of the attachment features 112 at the elongated groove 105a second bore 109. The placement within each of the elongated grooves 105, 105b is substantially similar, thus, only one is discussed for illustrative simplicity.

The second type of securing component is a ditch and bar attachment 116. In one example, ditch and bar attachments are placed along the length of the groove applique 111 and elongated groove 105a to longitudinally secure the groove applique 111 within the elongated groove 105a, at the plurality of apertures 158 (shown in FIG. 1) along the length of the roof panel opposing sides 104a, 104b from the elongated groove first end 106 to the elongated groove second end 107.

Referring to FIG. 2A, an example stanchion attachment securing component 115a, 115b is shown in conjunction with one of the elongate grooves 105a, 105b, the groove applique 111, and one attachment feature 112.

The groove applique 111 may include a base portion 135 having a first surface 136 and a second surface 137. The groove applique 111 may further include a plurality of retention features 150 extending downwardly from the second surface 137. The base portion 135 may define a plurality of apertures 138 therein between the first surface 136 and second surface 137, along the length of the groove applique 111 (only one aperture 138 is shown in the cross section of FIG. 2A for illustrative simplicity).

The attachment features 112 may include a platform portion 130 having a first surface 131 and a second surface 132. The second surface 132 of the platform portion 130 of the attachment feature 112 may be placed in fluid contact with the first surface 136 of the groove applique 111. The attachment features 112 may further include an extension portion 133 extending from the second surface 132 of the platform portion 130 and defining a cavity 134 therein. The extension portion 133 may be disposed within one of the apertures 138 defined between the first surface 136 and second surface 137 of the groove applique 111.

The stanchion attachment securing components 115a, 115b (the cross section of only one of which is shown in FIG. 2A) may include a first stanchion component 115a and a second stanchion component 115a. The first stanchion securing component 115a proximate the elongated groove first end 106 and the second stanchion component 115b proximate the elongated groove second end 107. Each of the first stanchion component 115a and second stanchion component 115b are configured to secure the groove applique 111 and one of the attachment features 112 within the one of the elongated grooves 105a, 105b at one of the first bore 108 and the second bore 109.

Each of the first stanchion attachment 115a and second stanchion attachment 115b may include a first fastening component 139 and a locking component 143. The first fastening component 139 may have a first end 140, a second end 141, and an intermediate portion 142. The first fastening component 139 may be a double ended stud or the like. The first end 140 of the fastening component 139 may be disposed within the cavity 134 defined by the extension portion 133 of the attachment feature 112. The intermediate portion 142 of the fastening component 139 may be disposed within one of the first bore 108 and the second bore 109 of one of the elongated grooves 105a, 105b. The second end 141 of the fastening component 139 may be disposed within the roof panel 101. The first fastening component 139 may be inserted within the cavity 134, one of the first bore 108 and the second bore 109 of one of the elongated grooves 105a, 105b and the roof panel 101 from the bottom up during assembly.

The locking component 143 may be configured to lock the first fastening component 139 to the roof panel 101. The locking component 143 may be an ASM carrier nut or the like. The locking component may be configured to be secured upon the first fastening component 139 between the second end 141 of the fastening component 139 and the intermediate portion 142 of the fastening component 139 to lock the respective elongated groove 105a, 105b between the intermediate portion 142 of the first fastening component 139 and the locking component 143.

Referring to FIG. 2B, an example ditch and bar securing component 116 is shown in conjunction with one of the elongate grooves 105a, 105b and the groove applique 111.

Each ditch and bar attachment 116 may be configured to secure the groove applique 111 within the respective elongated groove 105a, 105b along the length of the elongated grove 105a, 105b from the elongated groove first end 106 to the elongated groove second end 107. The ditch and bar attachment may include at least one securing clip 151 and a second fastening component 157.

The at least one securing clip 151 may be disposed within one of the elongated grooves 105a, 105b. The at least one securing clip 151 may have a central portion 152, a first end 153, and a second end 154. The securing clip may further include a first flange member 155 extending from the first end 153 and a second flange member 156 extending from the second end 154. The first flange member 155 may be configured to engage one of the retention features 150 of the groove applique 111.

The second fastening component 157 may be secured within one of the plurality of apertures 158 defined along one of elongated grooves 105a, 105b. The second fastening component 157 may be configured to engage the second flange member 156 of the at least one securing clip 151 and fasten the groove applique 111 within one of the respective elongated grooves 105a, 105b.

Figure 3:
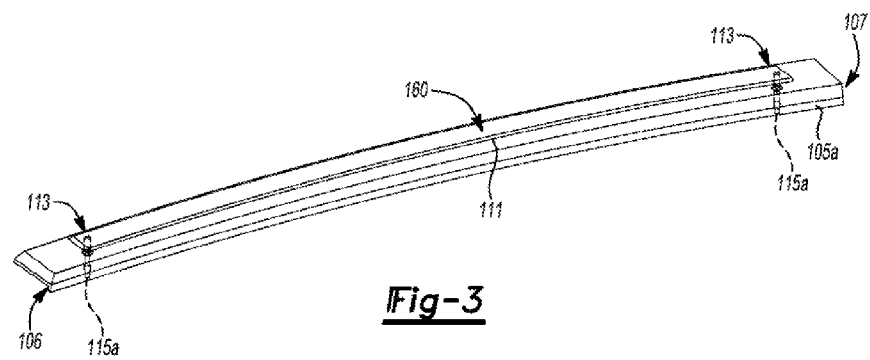
FIG. 3 is a schematic perspective view of a base model vehicle with a base molding overlaid upon the roof rack attachment assembly in lieu of a roof rack attachment.

Referring to FIG. 3, the roof rack assembly 110 may be incorporated into any vehicle. Base model vehicles may not come standard with a roof rack attachment 120 (shown in FIGS. 4-6), but may come standard with the roof rack attachment assembly so that the consumer may install one at a later time if so desired. In such a case, a base molding or overlay may be overlaid upon the roof rack attachment assembly 110 to preserve the assembly 110 and for aesthetic purposes.

Figure 4:
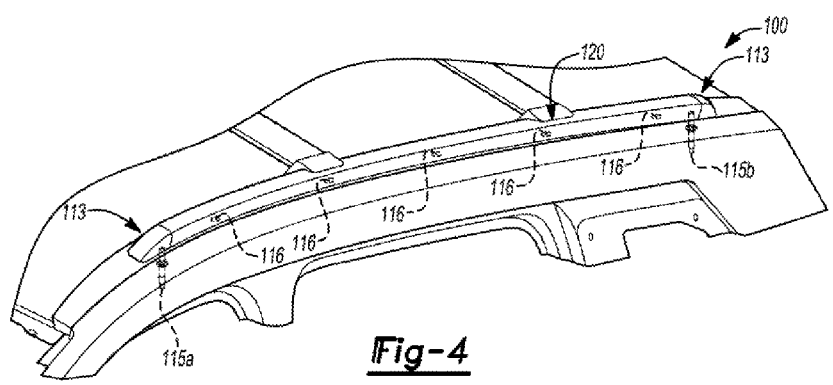
FIG. 4 is a schematic perspective view of a flush mount roof rack integrated onto a vehicle roof with the reconfigurable roof rack attachment assembly.
Figure 5:
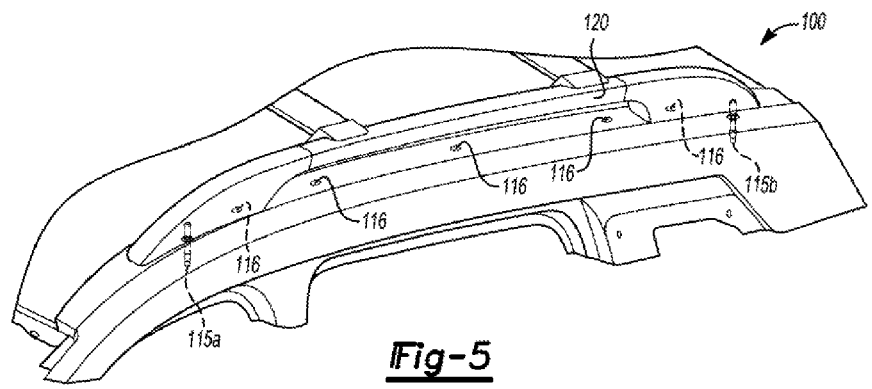
FIG. 5 is a schematic perspective view of a raised mount roof rack integrated onto a vehicle roof with the reconfigurable roof rack attachment assembly.
Figure 6:
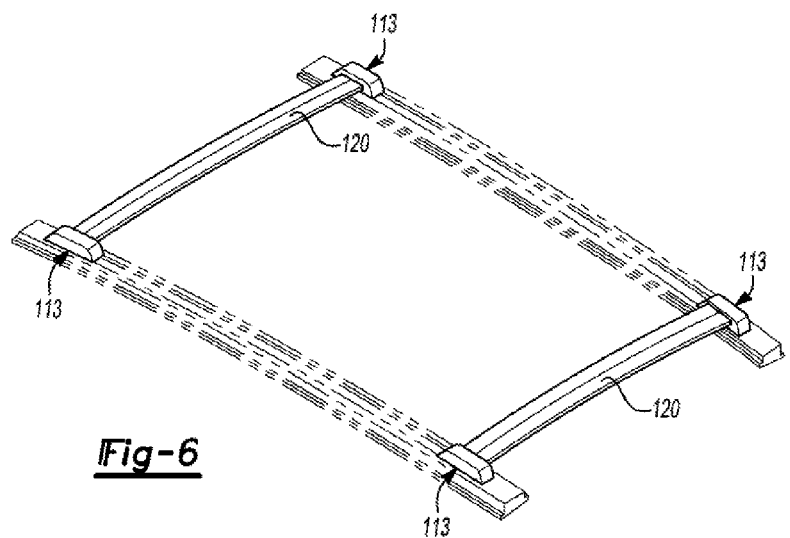
FIG. 6 is a schematic perspective view of a cross rail only roof rack design integrated onto a vehicle roof with the reconfigurable roof rack attachment assembly.

FIGS. 4-6 depict additional example configurations of the roof rack assembly 110 in conjunction with variably styled roof rack designs. It will be clear to one of ordinary skill in the art that these figures are considered illustrative examples and non-limiting to the scope of the invention. The roof rack assembly 110 described herein may be used in conjunction with variably styled roof racks including but not limited to those shown in FIGS. 4-6.

Referring to FIG. 4, the roof rack assembly 110 may be utilized in conjunction with a flush mount roof rack 120.

Referring to FIG. 5, the roof rack assembly 110 may be utilized in conjunction with a raised roof rack 120.

Referring to FIG. 6, the roof rack assembly 110 may be utilized in conjunction with a cross bar only roof rack 120.

A method of assembling a vehicle 100 having a roof panel 101 capable of receiving a roof rack 120 at a predetermined attachment point 113 is also provided. The method includes the steps of: placing a groove applique 111 within an elongated groove 105a, 105b defined by the roof panel 101; placing a plurality of attachment features 112 at desired predetermined attachment points 113 along the groove applique 111; and securing the groove applique 111 and attachment features 112 within the elongated groove 105a, 105b with a plurality of securing components 115a, 115b, 116.

The method may further include attaching a roof rack 120, of any style, to the vehicle 100 at the predetermined attachment points 113 during vehicle 100 assembly, wherein the vehicle 100 comes standard with a roof rack 120.

Alternatively, the method may further include overlaying a base molding 160 upon the roof rack attachment assembly 110 and attaching the base molding 160 to the attachment features 112 at the predetermined attachment points 113, wherein the vehicle 100 is a base model vehicle that does not come standard with a roof rack 120. The roof rack attachment assembly 110 will remain incorporated into the vehicle 100 and able to receive a roof rack 120 to be installed by the consumer or subsequent seller at a later date, after original assembly, if desired.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
a roof panel defining a plurality of elongated grooves, each of the respective elongated grooves having a first end and a second end, wherein the roof panel further defines a first bore within each of the respective elongated grooves proximate to the first end, a second bore within each of the elongated grooves proximate to the second end, and a plurality of apertures along each of the respective elongated grooves between the first end and the second end;
a base molding configured to be selectively coupled to the roof panel;
a vehicle roof rack configured to be selectively coupled to the roof panel, wherein the vehicle roof rack and the base molding are interchangeable with each other;
a roof rack attachment assembly disposed in each of the elongated grooves, the roof rack attachment assembly including:
a groove applique fixed within and extending along the length of each of the elongated grooves, wherein the groove applique includes a base portion having a first surface and a second surface and a plurality of retention features extending downwardly from the second surface, the base portion defining a plurality of apertures therein between the first surface and second surface;
a plurality of attachment features coupled to the groove applique, such that the base molding and the vehicle roof rack are configured to be interchangeably coupled to the roof panel at the plurality of attachment features, wherein each of the attachment features includes:
a base portion having a first surface and a second surface, the second surface of the base portion of the attachment feature in fluid contact with the first surface of the groove applique; and
an extension portion extending from the second surface of the base portion and defining a cavity therein, wherein the extension portion is disposed within one of the apertures defined between the first surface and second surface of the applique; and
a plurality of securing components configured to secure the groove applique and the plurality of attachment features within each of the respective elongated grooves, wherein the plurality of securing components includes a first stanchion attachment disposed proximate to the first end of the respective elongated groove, a second stanchion attachment disposed proximate to the second end of the respective elongated groove, and a plurality of ditch and bar attachments disposed along the respective elongated groove between the first stanchion attachment and the second stanchion attachment.

2. The vehicle of claim 1 wherein:
the first stanchion attachment secures the groove applique and one of the attachment features within one of the elongated grooves proximate to the elongated groove first end; and
the second stanchion attachment secures the groove applique and one of the attachment features within one of the elongated grooves proximate to the elongated groove second end.

3. The vehicle of claim 2 wherein each of the first stanchion attachment and the second stanchion attachment further includes:
a first fastening component having a first end, a second end, and an intermediate portion, the first end of the fastening component disposed within the cavity defined by the extension component, the intermediate portion disposed within one of the first bore and second bore of the respective elongated grooves, and the second end of the fastening component disposed within the roof panel; and
a locking component secured between the second end of the fastening component and the intermediate portion of the fastening component, the locking component configured to lock the fastening component to the roof panel.

4. The vehicle of claim 3 wherein each ditch and bar attachment is configured to secure the groove applique within the respective elongated groove, each ditch and bar attachment including:
at least one securing clip disposed within one of the elongated grooves, the at least one securing clip having a central portion, a first end, a second end, a first flange member extending from the first end, and a second flange member extending from the second end, the first flange member configured to engage one of the retention features of the groove applique; and
a second fastening component secured within one of the apertures defined along the respective elongated grooves and configured to engage the second flange member of the at least one securing clip and fasten the groove applique within the respective elongated grooves.

5. The vehicle of claim 4 wherein the second fastening component is a standard weld stud.

6. The vehicle of claim 3 wherein the first fastening component is a double ended stud.

7. The vehicle of claim 1 wherein the roof panel has a first end, a second end, and two opposing sides.

8. The vehicle of claim 1 wherein the plurality of attachment features are coupled to the groove applique, such that one of the plurality of attachment features is disposed proximate to the first end of the respective elongated groove and another of the plurality of attachment features is disposed proximate to the second end of the respective elongated groove.

9. The vehicle of claim 7 wherein the plurality of elongated grooves includes a first elongated groove and a second elongated groove each formed longitudinally and substantially parallel to the two opposing sides of the roof panel.

\* \* \* \* \*